Figure 1:
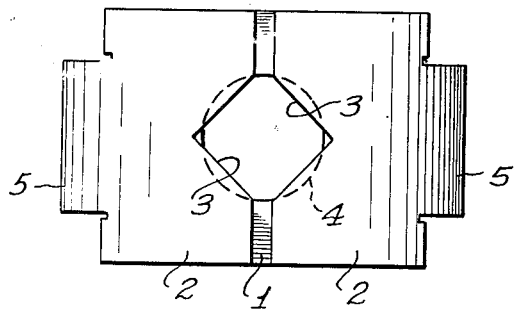

Jan. 23, 1945.  J. P. BURKE  2,367,659
NUT
Filed Aug. 18, 1943

INVENTOR.
James P. Burke
BY Albert J Taylor
ATT'Y

Patented Jan. 23, 1945

2,367,659

UNITED STATES PATENT OFFICE 2,367,659

NUT

James P. Burke, Poland, Ohio, assignor to F. L. McLaughlin, Detroit, Mich.

Application August 18, 1943, Serial No. 499,048

5 Claims. (Cl. 85—36)

This invention relates to nuts and has for its primary object to provide a nut incorporating the characteristics of both a speed nut and a lock nut, and more particularly, to incorporate such characteristics in a nut which may be inexpensively formed of sheet cold rolled steel by conventional metal stamping equipment.

The nut which has become known to the trade as a speed nut usually comprises a sheet metal form having flexible thread engaging fingers or prongs which enable the nut to be slipped over a screw or bolt so that the only screwing action required is that necessary to tighten the nut after it has been put in place. Many of such types of nuts are on the market and one of the greatest objections to their use is that they frequently become cocked as they are being slipped over the screw or bolt and this condition can only be corrected by unscrewing the nut, as it is impossible to slip them off once they have become cocked. This invention has for an important object to provide a nut which cannot become cocked as it is being slipped into place over the threads of a screw or bolt. To this end the invention provides a nut having flexible thread engaging prongs which enable the nut to be slipped over the threads of a screw or bolt and also having a portion which acts in the nature of a guide to prevent the nut from cocking as it is slipped over the threads.

Another object is to provide a nut of the character above described which is so formed that as the screw or bolt it engages is drawn tight it tends to deform in a manner to place the thread engaging prongs in compression and to force them into tighter engagement with the threads. This characteristic of the nut results in a very severe binding action and the nut will remain tight under severe vibration conditions.

Another object is to provide a nut of the character above described which is also suitable for use on studs or the like having a smooth exterior, or where no threads are present. In other words, the present nut might also be considered as a retainer which may be slipped over a plastic stud, for example, and which when slipped into place tends to bite into the stud in such manner that its removal is very difficult.

The objects above set forth are accomplished by the provision of a nut having thread or post engaging prongs or fingers which are so formed that they may be readily flexed, whose action is to be distinguished as being nearer to a hinge action than to an action where a change in the structure of the metal takes place. To enhance this action the nut formation includes specially constructed finger portions which have two very definite functions. First, they constitute finger portions which make it possible for the operator to spring the prongs or thread engaging fingers apart so that the nut may be readily slipped into place. Secondly, the fingers that make placement of the nut easier, function during the tightening action to force the thread or stud engaging prongs or fingers into tight engagement with the threads or stud. In the case of a stud, manual pressure is sufficient to deflect these fingers to an extent whereby the prongs or fingers tend to bite into the stud so that functioning as a retainer the nut provides a very efficient retaining action.

Another object of the invention is to provide a nut of the character above described which has means for engaging the surface it is drawn tight against in such a manner that it is unnecessary to hold the nut against rotation while a screw is being tightened therein.

Figure 2:
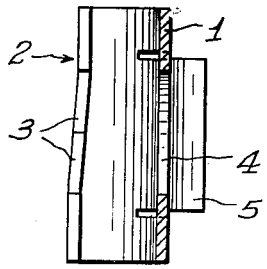
Figure 3:
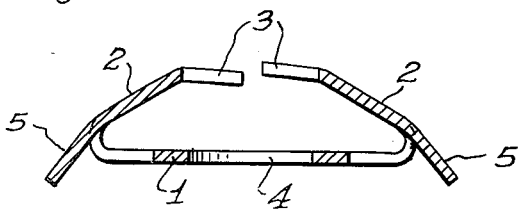
Figure 4:
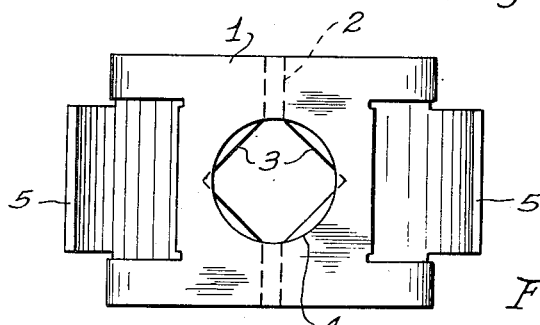
Figure 5:
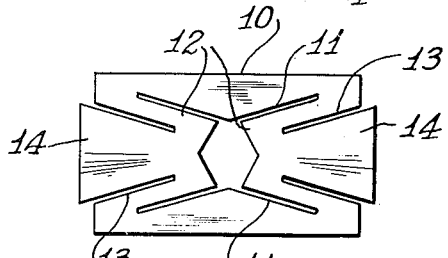
Figure 7:
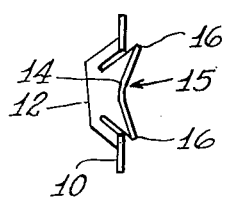
Figure 6:

With the above and other ends in view the invention is more fully disclosed with reference to the accompanying drawing, in which Fig. 1 is a top plan view of the nut, Figs. 2 and 3 are cross sections, Fig. 4 is a bottom plan view, Fig. 5 is a plan view illustrating another embodiment of the invention, and Figs. 6 and 7 are side and end elevations, respectively, of the embodiment shown in Fig. 5.

More specifically, 1 designates the base portion of a sheet metal form which has its end portions 2 formed upwardly and extending toward each other in spaced relation to the base portion. The terminals of the portions 2 are notched and shaped at 3 for engagement with the threads of a screw or bolt, so that said portions 2 constitute thread or stud engaging fingers or prongs. The base portion 1 has an aperture 4 in line with the notches 3, so that when a screw or bolt is inserted into engagement with the notches the wall of the aperture acts to guide the screw so that it cannot become cocked with respect to the prongs.

The prongs or fingers 2 are severed to provide extensions 5, which project below the base portion 1. These extensions have three distinct functions. First, they enable the operator, by pushing downwardly on the outer ends thereof, to spring the thread engaging prongs apart, so that the nut can be easily slipped over the threads of a screw. Secondly, when the nut is being tightened they tend to force the prongs inwardly and to compress them against the threads they engage and, thirdly, the edges of the extensions tend to bite into the surface the nut is being drawn tight against, so that it is not necessary to manually hold the nut against rotation while the screw is being tightened.

In Figs. 5, 6 and 7 there is disclosed a nut which functions in a manner similar to that above described, with the exception that it does not have the piloting aperture. In this case the nut comprises a sheet metal body 10 which is slitted at 11 to form two upwardly extending thread or stud engaging prongs 12. These prongs are also slitted at 13 to form extensions 14 which constitute finger pieces to enable the operator to flex the prongs 12 apart. The ends of the finger pieces 14 are arched at 15 so that sharp corners 16 are presented for contact with the surface the nut is to be drawn tight against. These sharp corners bite into the engaged surface and make it unnecessary to hold the nut against rotation while a screw is being tightened thereagainst.

A characteristic of both of the nuts above described is that the extensions tend to increase the "grabbing" action of the prongs, and it is therefore possible for the nut to act as a retainer on a smooth stud, or in other words, on an element having no screw threads.

Although specific embodiments of the invention have been shown and described it will be understood that various changes may be made within the scope of the appended claims without departing from the spirit of the invention, and such changes are contemplated.

What I claim is:

1. A retainer comprising a sheet metal base portion, flexible prongs formed integral with said base portion and disposed angularly with respect to the base portion in opposed relation and constituting gripping elements, said retainer having extending portions formed by slitting through the base portion, said extending portions being angularly inclined to the base portion in substantial alignment respectively with the flexible prongs which constitute the gripping elements, said extending portions being adapted by application of pressure thereagainst to spread said prongs apart or to force them together according to the direction of application of such pressure.

2. A retainer comprising a sheet metal base portion, flexible prongs formed integral with said base portion and disposed angularly with respect to the base portion in opposed relation and constituting gripping elements, said retainer having extending portions formed by slitting through the base portion, said extending portions being angularly inclined to the base portion in substantial alignment respectively with the flexible prongs which constitute the gripping elements, said extending portions being adapted by application of pressure thereagainst to spread said prongs apart or to force them together according to the direction of application of such pressure, said base portion having a guide aperture in line with said prongs the walls of which act as means for preventing a screw from cocking between said prongs.

3. A retainer comprising a sheet metal base portion, flexible prongs formed integral with said base portion and disposed angularly with respect to the base portion in opposed relation and constituting gripping elements, said retainer having extending portions formed by slitting through the base portion, said extending portions being angularly inclined to the base portion in substantial alignment respectively with the flexible prongs which constitute the gripping elements, said extending portions being adapted by application of pressure thereagainst to spread said prongs apart or to force them together according to the direction of application of such pressure, said extending portions having parts thereof bent to form gouging points which are adapted to bite into a surface against which said retainer is drawn and which function to prevent rotation of the retainer as a screw is screwed therein.

4. A retainer comprising a sheet metal base portion, flexible prongs formed integral with said base portion and disposed angularly with respect to the base portion in opposed relation and constituting gripping elements, said retainer having extending portions formed by slitting through the base portion, said extending portions being angularly inclined to the base portion in substantial alignment respectively with the flexible prongs which constitute the gripping elements, said extending portions being adapted by application of pressure thereagainst to spread said prongs apart or to force them together according to the direction of application of such pressure, said base portion having a guide aperture in line with said prongs the walls of which act as means for preventing a screw from cocking between said prongs, and said extending portions having parts thereof bent to form gouging points which are adapted to bite into a surface against which said retainer is drawn and which function to prevent rotation of the retainer as a screw is tightened therein.

5. A nut comprising a base portion having its opposite free ends bent upwardly and rearwardly thereover to form gripping tongues, said gripping tongues having their terminals notched to provide thread or stud engaging portions, and an aperture in said base portion disposed in such manner that the walls thereof constitute guide surfaces for a screw or stud as said screw or stud is placed in engagement with said prongs, said prongs having extending portions formed by slitting through the base portion, said extending portions being angularly inclined to the base portion and in alignment respectively with the gripping tongues, said extending portions being adapted by application of manual pressure thereagainst to flex said prongs apart.

JAMES P. BURKE.